United States Patent Office 3,163,861
Patented Dec. 29, 1964

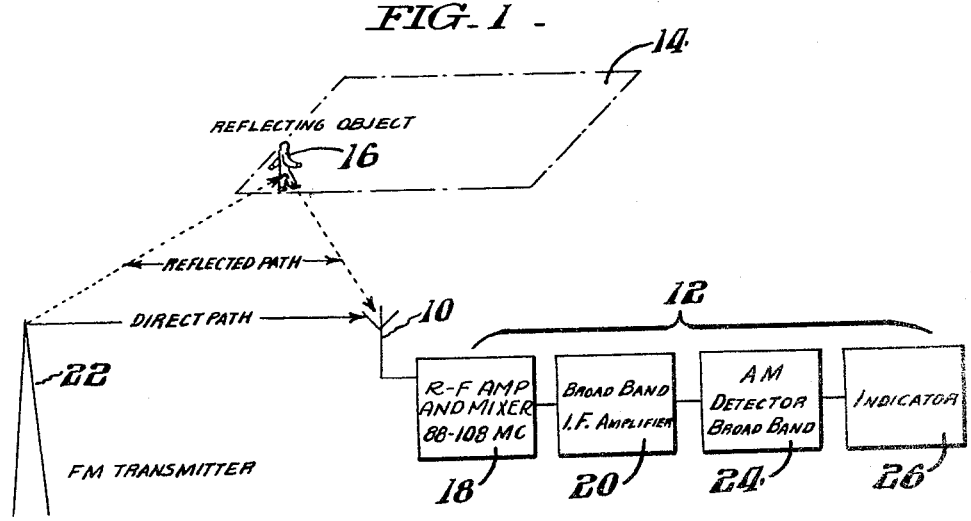

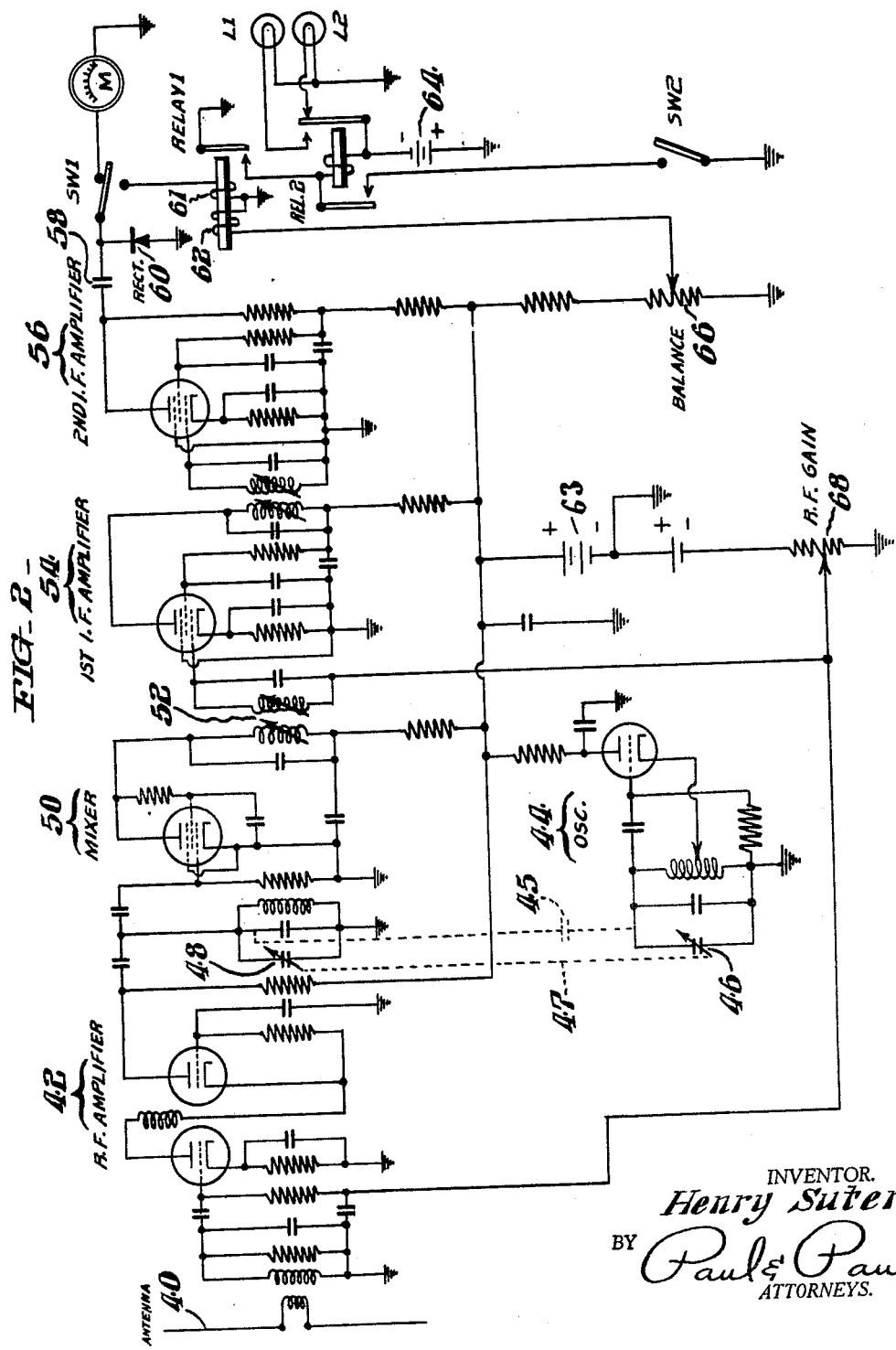

3,163,861
ELECTROMAGNETIC FIELD DISTURBANCE
INTRUDER DETECTION APPARATUS
Henry Suter, 80 Crooked Billet Road, Hatboro, Pa.
Continuation of application Ser. No. 856,124, Nov. 30,
1959. This application May 2, 1962, Ser. No. 193,892
3 Claims. (Cl. 343—14)

The present invention relates to a new and novel method of and means for electronic detection, and is particularly adapted to detect a change in the presence, and/or size, and/or location and movement of radio frequency wave reflecting objects in a particular zone under observation.

A unique feature of the present invention is the fact that the energy utilized in the present invention, either sonic or electromagnetic, is readily available without the necessity of providing a source of such energy since the energy utilized according to the present invention is supplied normally for other purposes. Under conditions of known parameters, the apparatus may be utilized to determine relative velocities.

This application is a continuation of my copending United States patent application Ser. No. 856,124, filed November 30, 1959, now abandoned.

The invention may be advantageously employed to inform an observer, as for example an attendant of an establishment, that a person is approaching or has entered an area under surveillance, or that an object which is normally present has been or is being removed or that an object or person normally in motion has ceased to move and the like.

It is apparent that in fact the present invention may be utilized for detecting any movements or changes of wave reflecting objects in a particular zone. The objects may take different forms as is apparent, and in a typical example, the invention may be utilized as a vehicle detector wherein it detects the movement of vehicles within a certain zone. The zone may be a selected area of a highway or the like and the device may accordingly be utilized for controlling traffic signals if desired.

A further application of the invention is for the detection of the presence or relative movement of aircraft within a certain zone.

In the preferred form, the invention makes novel and advantageous use of the radiation of a local radio station whose transmission is not amplitude modulated, but rather is frequency-modulated. Any conventional commercial frequency-modulated radio station whose signal is capable of being detected in the zone under observation will be suitable for the purposes of the present invention.

An object of the present invention is to provide a new and novel method of and means for electronically detecting many movements or changes of objects in a zone under observation.

Another object of the invention is to provide a method and means for electronic detection which eliminates the necessity of providing any source of energy or transmitting means and which relies solely upon the radiated energy of a local commercial frequency modulation radio station.

Other objects and many attendant advantages of the invention will become more apparent when considered in connection with the specification and accompanying drawing, wherein:

FIG. 1 is a diagrammatic illustration of a system embodying the present invention; and FIG. 2 is a detailed schematic of one form of system which will perform the functions indicated in the block diagram of FIG. 1.

The invention as illustrated and described herein has particular reference to its use in alerting an attendant to the fact that a person has entered or has left an area under surveillance, although it is to be clearly understood that the invention is not limited to such use. Moreover, in describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

According to a preferred embodiment of the invention, as illustrated in FIG. 1, a receiving antenna 10 having radio receiving means 12 coupled thereto is placed either inside or outside the area 14 under surveillance or observation, but in a position to receive signals reflected from objects or persons 16 within the area. The radio receiving means 12 includes a tuner 18 and an I.-F. (intermediate-frequency) amplifier 20 of sufficient bandwidth to pass all significant sidebands of the modulation. The tuner 18 comprising a radio-frequency amplifier and a mixer is tuned to the selected commercial normally-transmitting FM station 22. The detector 24 of said receiving means is, however, a broad-band AM detector, that is to say, a detector capable of detecting amplitude modulations but not capable of detecting the frequency modulations which are transmitted by the FM station for normal communication or other purposes. Accordingly, the broad-band AM detector negates the effects of any modulation which may be transmitted by the FM station. Since the broadband AM detector will rectify essentially the full bandwidth of the I.-F. (intermediate-frequency) signal, a direct-current (D.-C.) voltage will be obtained from apparatus which will be independent of the modulations supplied by the FM station; and the amplitude of this D.-C. voltage will be indicative of the field strength of the radio signal at the location of the receiver antenna 10.

As is well known, the signal strength at a radio receiver antenna is the net result of energy propagated over many paths, depending upon the relative locations of the transmitting and receiving antennas and the intervening and surrounding reflecting objects. In order for a reflecting object to have an appreciable effect upon the net signal strength, it should in general be at least comparable in size to the wavelength of the radio signal, and it must be physically close enough to the receiving antenna so that an appreciable amount of the net received energy at the receiver is obtained via the reflecting object. Presently assigned frequencies for FM broadcast stations are in the 100 megacycle region, specifically 88–108 megacycles, and hence have a wavelength which has been found useful in reflecting signals from persons moving in the vicinity of the receiving device being described.

Under normal or quiescent conditions, the output voltage from the detector described above will have a steady value which may, for example, be compared with a reference signal and a balanced condition set up which will, for example, not cause a relay to operate. If an object or person in the area under observation moves, or is removed, this balanced or preset condition will change, and the output voltage from the previously balanced comparison circuit will change, causing the relay to operate. This operated relay may, for example, provide an audible or visual signal as represented in FIG. 1 by the indicator 26.

The magnitude of the change in the detector output voltage, as objects or persons in the supervised area move or change in number, can be increased by the use of a directional antenna. If, for example, a simple dipole antenna is used and so oriented that its "cone-of-silence" is directed toward the direction of normally greatest signal strength reception, the normal strength of the signal received by a direct path from the transmitting station can be made relatively small. Thus, changes in received signal strength caused by changes in reflections from other directions will create a relatively large change in output voltage. It is the percent change from normal, rather than the absolute signal strength, which is indicative of a change in the geometry of the field pattern.

The FM radio station will radiate a constant amount of power regardless of whether any sound is being transmitted or not. The transmitted carrier frequency is varied over a certain frequency band, which may be for example plus or minus 75 kilocycles per second with a center or resting frequency in the 100 megacycle region. This maximum swing of plus or minus 75 kilocycles represents the loudest volume the station may transmit, while zero swing is silence. The present invention is so designed as to rectify or detect the full bandwidth swing so that it normally registers a fixed signal strength regardless of the modulation or lack of it provided that the paths over which the signal travels do not materially change.

The effect of interaction of signals coming along different paths will depend upon the path length difference. Some signals may come directly from the radio station transmitter, while many other signals will be reflected from different objects, some of which may be in the zone under observation. If the paths of two signals differ by an integral number of wavelengths, they will add directly, but if by an odd number of half wavelengths, they will subtract, while intermediate distances will yield intermediate values. Obviously, the phase difference is important in determining the amplitude of the resultant signal. Since the wavelength at the frequency involved in the present invention is about 10 feet, this technique is particularly effective where the movable reflecting objects are close to the receiving antenna relative to the other reflecting objects or where the receiving antenna is advantageously oriented.

It may not always be necessary or even desirable to orient the antenna such that it is oriented toward the zone under observation, and substantially transverse to the direction in which the transmitting station antenna is located, although this arrangement tends to increase the net change in the resultant signal. This change is actually a fluctuating change brought about not only by the changing object-to-receiver distance, but also by the changing phase relationship of the direct and reflected signals. When the direct and reflected signals are made more nearly equal in amplitude by such antenna orientation, the resultant algebraic sum of the two signals at the receiver will fluctuate from approximately twice one of the signals to almost zero as the difference in distance from the reflecting object to the receiver is changed by one half wave length.

The modulation applied to the carrier frequency by the FM system does not materially affect the operation of the apparatus, since the distance over which the system is used is short as transmitting distances go. As a result, at 100 megacycles, even a full plus or minus 75 kilocycle modulation does not shift the phase enough to compare with the phase shifts brought about by the motion of the reflecting object, and accordingly, the only substantial phase shifts which will be effective for accomplishing the purposes of the present invention will be produced by motion of the reflecting object.

The provision of means for utilizing the energy in the standard transmission of available, normally-operating, FM broadcast stations to provide an indication of sensing of various types of motion or presence is, I believe, novel. The advantages are obvious. The equipment required is made simple and inexpensive by the lack of need of transmitters and transmitting antennae, and since no energy is transmitted by the apparatus of the present invention, none of the already crowded spectrum is required and hence no Federal Communication Commission license is required for its use.

Unless care is exercised in the location of the receiving antenna and in the sensitivity of the equipment, interference will be experienced from aircraft flying in the general area. In order to avoid this difficulty, adjustments are provided to regulate the sensitivity. However, if desired, the equipment may be made sensitive to these aircraft, and can be used for air traffic monitoring purposes or as an aid to aircraft spotters.

One system for accomplishing the objectives of this invention is shown schematically in FIGURE 2. The dipole antenna 40 is coupled in the input of a cascode type radio-frequency amplifier 42. The amplified signal is combined with the stray capacitatively-coupled oscillations of the oscillator section 44 (the stray capacitance being represented by the dotted capacitor 45). The oscillator tank capacitor 46 is shown (by the dotted line 47) to be mechanically coupled with the tank capacitor 48 of the mixer 50. The intermodulation product whose frequency is the difference between that of the R.F. (radio-frequency) signal and the oscillator signal is coupled through a tuned I.-F. (intermediate-frequency) transformer 52 to the first I.-F. amplifier 54. The output of this stage is then similarly coupled to the second I.-F. amplifier 56. The output of these conventional radio stages, which are designed to operate on frequency-modulated (FM) signals, is then coupled through a blocking capacitor 58 to a diode rectifier 60. With the switch SW1 set as indicated, the signal strength will be indicated by the meter M.

If the switch SW1 is operated to its other position to close the normally-open relay circuit, the relay 1 will tend to operate due to current flow through winding 61. A second winding 62 is provided on relay 1 through which current flows from battery 63 and the magnetizing force resulting from this current through winding 62 tends to oppose that resulting from current through winding 61. The magnitude of this opposing force can be regulated by adjusting the setting of the balance potentiometer 66. This is usually set so that under normal or quiescent conditions within the zone under observation, the relay 1 does not operate. If this preset condition is altered, by either an increase or decrease of the R.F. signal strength, and hence also of the I.-F. signal strength, the current through winding 61 will change and the magnetizing forces will no longer be balanced. Relay 1 thereupon operates, causing relay 2 to operate. If switch SW2 is closed when relay 2 operates, relay 2 will lock closed, even if the closure of relay 1 was only momentary. As the circuit is shown, lamp L2 is normally lighted by the battery 64. When relay 2 operates current from battery 64 flows through lamp L1 and the circuit through lamp L2 is broken. Thus, lamp L1 will light and lamp L2 will be extinguished. Manually opening switch SW2 will unlock relay 2 allowing it to release, provided relay 1 is in released condition.

It should be understood that using the change in signal strength to actuate relays in the manner shown in FIG. 2 is only one of a number of readily available methods for indicating that a change has occurred in the signal strength of the reflected F.M. signal.

The sensitivity of the apparatus may be varied by adjusting the R.F. gain potentiometer 68. This adjusts the negative bias on the R.F. and first I.-F. amplifier tubes. The sensitivity may be adjusted to eliminate or at least substantially reduce interference from passing aircraft. Alternatively, the system may be employed to detect passing aircraft.

While I have described my invention with respect to the use of a commercially broadcast frequency-modulation signal, it should be understood that the concept of my invention is also applicable to a sonic system in which, for example, ultrasonic waves are directed toward an observation zone, the reflected waves therefrom detected, and the amplitude thereof compared with a reference signal, whereby changes in the amplitude of the detected reflected waves may be utilized to inform an observer of changes in number or position of reflecting bodies located in the observation zone.

While the preferred embodiment of this invention has been described in some detail, it will be obvious to one skilled in the art that various modifications may be made without departing from the invention as hereinafter claimed.

I claim:

1. Object detection apparatus operable in combination with a remotely located relatively inaccessible commercial frequency modulation broadcast transmitter having frequency modulating means for normally producing only a frequency modulated radio frequency carrier signal of a predetermined carrier frequency and having antenna means connected to said transmitter for radiantly propagating said carrier signal into a predetermined area including at least one zone protected by object detection apparatus comprising; receiver means remotely located from said transmitter and antenna means and having a tuner for selecting one said frequency modulated radio frequency carrier signal and having wide band amplifier means connected to said tuner for substantially linearly reproducing said selected frequency modulated radio frequency carrier signal, receiver antenna means for picking up and feeding signals propagated within said zone to said receiver means, including said frequency modulated radio frequency carrier signal produced by said remote transmitter and reflected from any object within said protected zone, indicator means for providing a perceptible alarm to the entrance of an object into said protected zone, an amplitude modulation detector having an output connected to said indicating means and an input connected to said amplifier means for energizing said indicator means solely in response to the detection of any amplitude modulation of said carrier signal and for preventing the transmission of any frequency modulation to said indication means.

2. Apparatus as defined in claim 1 wherein said indicator means provides a continuous perceptible alarm, and including a holding circuit means responsive to the energizing of said indicator means for maintaining said indicator means energized.

3. Apparatus for use in an object detection system comprising wide band receiver means for receiving and substantially linearly amplifying a normally frequency modulated radio frequency carrier signal, and an output, an energizable alarm indicator having an operated condition for emitting a perciptible signal, first circuit means responsive to a signal at its input for initially energizing said indicator for placing said indicator in its operated condition, second circuit means responsive to said initial energizing of said indicator for maintaining the energization of said indicator to hold said indicator in its operated condition, a wide band amplitude modulation detector having an input connected to the output of said receiver means for detecting only amplitude modulation of said normally frequency modulated radio frequency carrier signal, and an output connected to the input of said first circuit means for providing a signal at said output responsive to the detection of any amplitude modulation of said normally frequency modulated radio frequency carrier signal and for preventing the transmission of any frequency modulation to said first circuit means.

References Cited in the file of this patent

UNITED STATES PATENTS

| | | |
|---|---|---|
| 2,038,878 | Strutt | Apr. 28, 1936 |
| 2,071,933 | Miessner | Feb. 23, 1937 |
| 2,247,246 | Lindsay | June 24, 1941 |
| 2,268,587 | Guanella | Jan. 6, 1942 |
| 2,451,141 | Woff | Oct. 12, 1948 |
| 2,512,530 | O'Brien et al. | June 20, 1950 |
| 2,561,088 | Anderson | July 17, 1951 |
| 2,749,537 | Loudon et al. | June 5, 1956 |
| 2,782,405 | Weisz et al. | Feb. 19, 1957 |
| 2,879,344 | Chatterton | Mar. 24, 1959 |
| 3,045,233 | Katz | July 17, 1962 |

FOREIGN PATENTS

| | | |
|---|---|---|
| 540,185 | Great Britain | Oct. 8, 1941 |
| 640,929 | Great Britain | Aug. 2, 1950 |